Jan. 30, 1968     N. F. CLAYBORNE ET AL     3,366,075
METHOD OF WELDING CONTINUOUS RAIL
Filed Aug. 28, 1963                        3 Sheets-Sheet 1
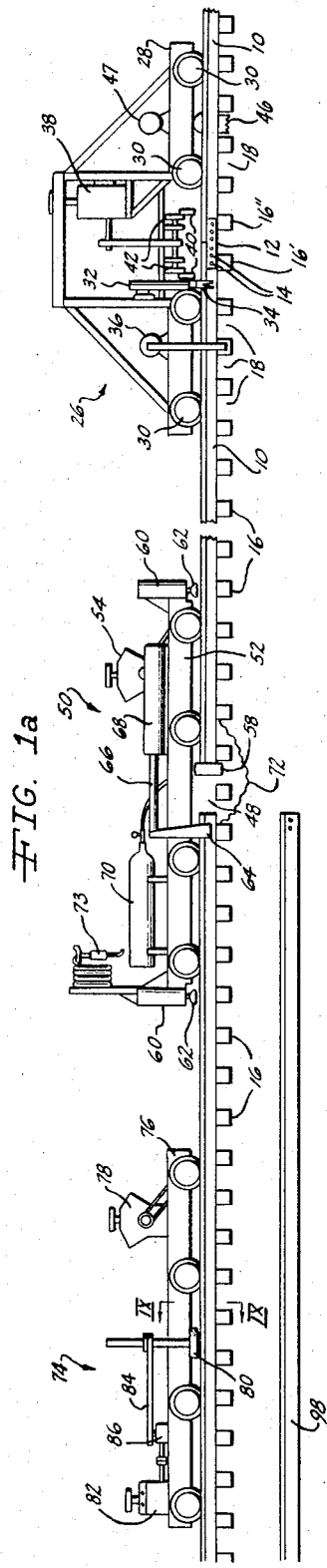
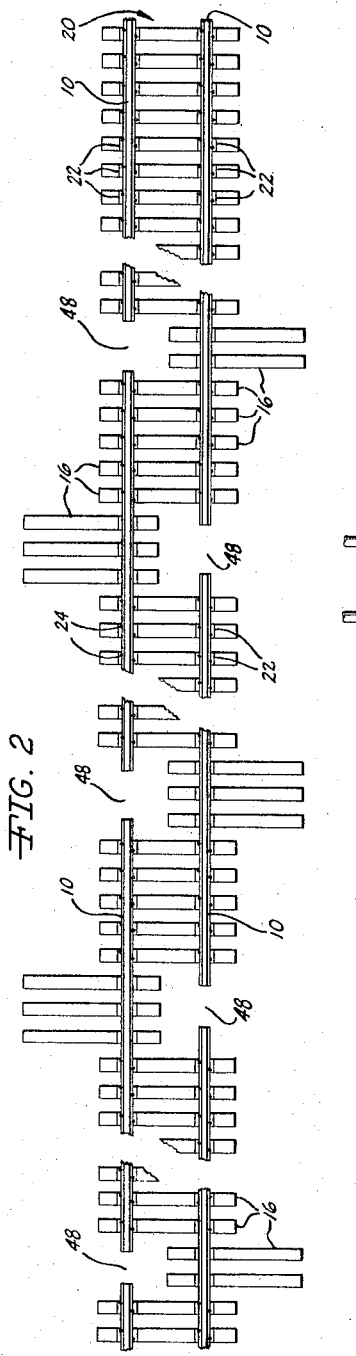
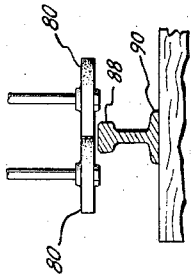
INVENTORS
NORMAN F. CLAYBORNE
MAX E. KERNS
WILLIAM E. HAMLIN
BY *Beaman & Beaman*
ATTORNEYS

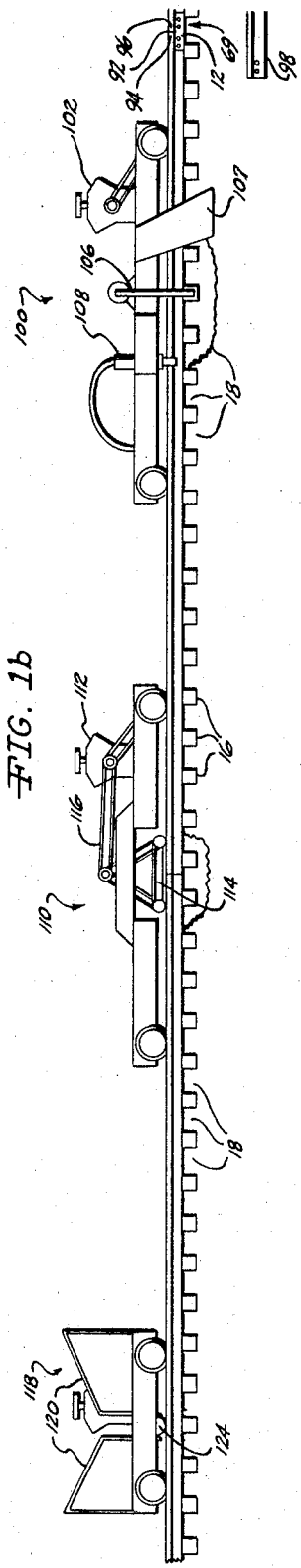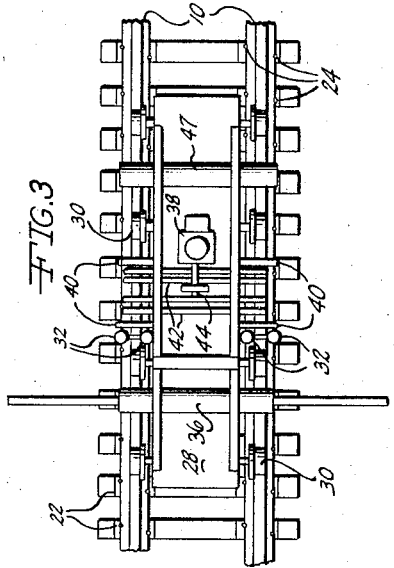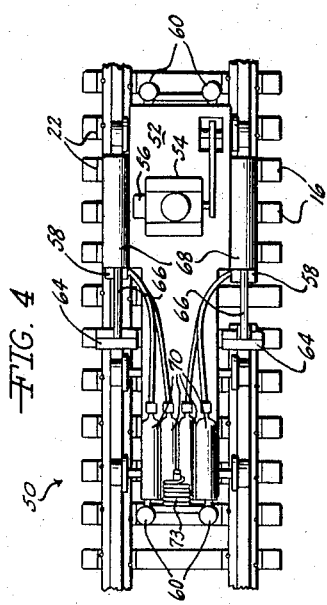

Jan. 30, 1968  N. F. CLAYBORNE ET AL  3,366,075
METHOD OF WELDING CONTINUOUS RAIL
Filed Aug. 28, 1963  3 Sheets-Sheet 3
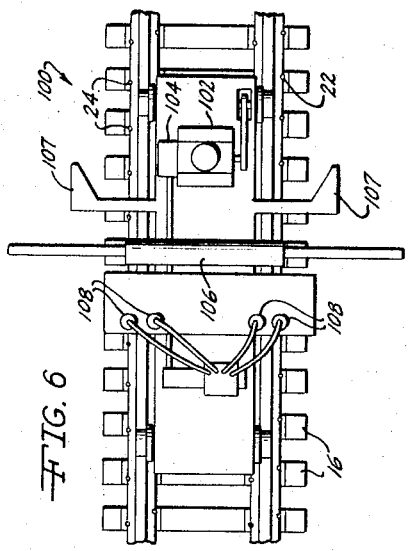
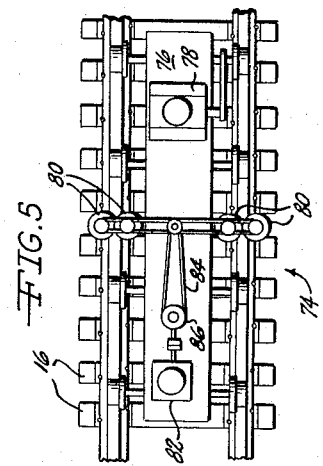
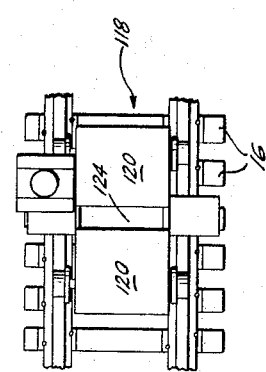
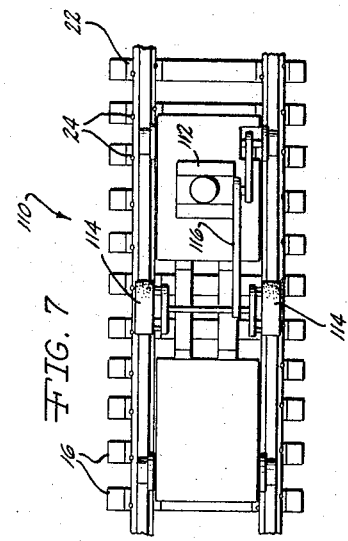
INVENTORS
NORMAN F. CLAYBORNE
MAX E. KERNS
WILLIAM E. HAMLIN
BY
ATTORNEYS 3,366,075
METHOD OF WELDING CONTINUOUS RAIL
Norman F. Clayborne, Monticello, Ind., Max E. Kerns, Greenwich, Conn., and William E. Hamlin, Jackson, Mich., assignors to Railway Automation Maintenance Specialties Company, Jackson, Mich.
Filed Aug. 28, 1963, Ser. No. 305,127
10 Claims. (Cl. 104—15)

The invention pertains to a method of welding railroad rails to form "continuous rail," and particularly relates to a rail welding method wherein "in-track" rails are welded together without removing the rails from the roadbed.

Railroads are currently in the process of converting railroad track formed from a plurality of rails of conventional length, usually thirty-nine feet, normally interconnected by bolts and joint bars at the ends, to "continuous welded rail." The end-to-end welding of railroad rails to form a continuous rail length of up to one quarter of a mile, or even greater, substantially reduces the rail maintenance required in that the damage occurring at the rail ends is considerably minimized, rail misalignment is also minimized, and a much smoother and quieter ride is produced. At the present time the conversion from bolted conventional rail length track to welded rail track is very expensive, time consuming, and disrupts the track service while the conversion is being made.

The replacement of the bolted conventional length rails with welded rails by the conventional method entails the removal of the tie plates, spikes, and the bolted rails, and the substitution of the welded rail which must be placed upon tie plates and spiked to the ties. Welded rail is formed by butt-welding the rail ends of conventional rail lengths together, and such welding is usually done at a permanent or semipermanent location to which the short rail lengths are transported and from which the longer welded rail lengths are shipped. Therefore, it will be appreciated that conventional methods for replacing bolted rails with welded rails entail a considerable amount of labor, time, and transportion of the rails.

It is the basic object of the invention to provide a method for converting interbolted rails of the short conventional length to a welded rail construction wherein all of the rail operations occur "in-track" and only relatively slight disturbance to the roadbed is necessary, and wherein the cost of converting interbolted rail to welded rail is substantially reduced over prior known methods.

The basic object of the invention is accomplished by a method which may be summarized as follows: The ends of the conventional interbolted rails are cropped or removed adjacent the bolted tie bar connection, whereby clean rail ends are exposed having a cross section representative of the entire rail length. The ties and ballast directly below and adjacent the cropped rail ends are removed to provide a clearance below the cropped section, and one of the rails is longitudinally translated in-track to abut the cropped rail ends. Such translation is possible as the translated rail has been unbolted at its uncropped end. The cropped rail ends are abutted and welded. The welded joint is machined to eliminate flash and other deformities at the joint, and the roadbed is restored to its original condition. The longitudinal translation of the rail to abut the severed ends is in the same direction as the movement of the machines performing the cropping, rail translation, welding, and machining, and as a section of rail is removed at each interbolted joint a gap is formed in the track at the unbolted end of the first rail welded. When this gap substantially equals the length of a conventional rail, a conventional rail length is placed within the gap and either bolted or welded in place. By translating the rail in the same direction as the rail fabricating equipment is traveling, the location of the bolted joints and the welds is known and, thus, the machine cropping the rails may precede the welding equipment by a considerable distance, if desired. The rail welding operation takes place alternately on the rails constituting a track, and as the entire operation disturbs only a small portion of the roadbed, the track is not significantly disturbed and, if desired, may be restored to service on several hours notice or at the end of a working day. Also, the conversion of the rails by the method of the invention upon ceasing leaves the track in a serviceable condition which does not interfere with the block system.

Therefore, it is another object of the invention to provide a method of forming welded rail wherein minimum disturbance of the roadbed takes place and wherein, in a relatively short time, the track may be restored to a suitable condition without interfering with the block system.

A further object of the invention is to provide a method for welding railroad rails wherein the welding operation occurs "in-track" and requires less labor and time than prior rail welding methods.

An additional object of the invention is to provide a method for producing welded track wherein the location of the sequential operations involved may be easily predetermined, and the rail translation occurs in the same direction as the movement of the machines involved in the welding operation.

These and other objects of the invention will be apparent from the following description of the procedure involved in the practice of the method, and from the accompanying drawings wherein:

FIG. 1(a and b) is an elevational view of a roadbed, and the machinery involved in the practice of the rail welding method of the invention, FIG. 2 is a plan view of a track as prepared for the welding operation and prior thereto, FIG. 3 is a plan view of the rail-cropping and tie and ballast-removing apparatus, FIG. 4 is a plan view of the rail-translating and joint-welding apparatus, FIG. 5 is a plan view of the initial rail welded joint-machining apparatus, FIG. 6 is a plan view of the spike-driving and tie-positioning apparatus, FIG. 7 is a plan view of the final welded joint rail ball-machining apparatus, FIG. 8 is a plan view of the ballast-relocating and digger device and the rail-anchoring apparatus, and FIG. 9 is a detail, enlarged, elevational view of the initial rail-grinding apparatus, as taken along section IX—IX of FIG. 1.

The practice of the method of the inventive concept will be best appreciated with regard to a description of the drawings. As discussed in the preamble, railroad rails of conventional length are shown at 10, FIG. 1, being bolted in end-to-end relationship by joint bars 12 and bolts 14, in the usual manner. The railroad rails 10 are mounted on conventional railroad ties 16 supported on stone ballast 18 constituting the roadbed for the track 20. For purposes of definition, the track 20 consists of two sets of parallel rails mounted upon common ties. In the conventional manner, tie plates 22 are interposed between the rails 10 and the ties 16, and spikes 24 driven through openings in the tie plates include heads which overlap the rail flange.

In the practice of the invention, a combination spike puller, tie remover, ballast remover, and rail-cropping machine 26 is mountd on an eight-wheeled truck 28, of which the axles supporting the truck wheels 30 are rigidly affixed relative to the truck frame. The machine 26 is positioned over a conventionally bolted rail joint so that the hydraulic cylinders 32 of the spike pullers 34 may remove the spikes 24 from the ties near the joint. For instance, if the rail joint lies between adjacent ties, only the two ties 16 nearest the joint need to have the spikes pulled therefrom. If the rail joint lies directly over a tie, usually it will be necessary to remove that tie plus the ties on either side of the centrally located tie to provide enough clearance to permit the welding operation as later described. In FIG. 1, the joint under machine 26 is illustrated as lying between the ties 16' and 16" and, thus, only ties 16' and 16" need be removed from under the rail joint. After all of the spikes 24 have been pulled from the ties which are to be removed from under a rail joint, for instance 16' and 16", the truck 28 is repositioned so that the hydraulically operated tie pusher 36 mounted on the truck can axially translate the ties 16' and 16" from under the rail joint. It is only necessary to push the ties 16' and 16" approximately one-half their length in order to provide sufficient clearance under the rail joint for the welding operation. The displaced tie relationship will be appreciated from FIG. 2.

After the ties 16' and 16" have been removed from under the joint, the truck 28 is positioned to perform the rail-cropping operation. As shown in FIGS. 1 and 3, the machine 26 includes an engine 38 adapted to drive a hydraulic pump and a plurality of cropping tools such as rotary grinding or cutting discs 40. The discs 40 may be mounted on beam support members 42 which extend across the track gauge wherein a rotary tool 40 is mounted on each end of a tool beam support 42 directly above a rail. The tools 40 disposed above a common joint are longitudinally spaced with respect to the track, and means 42 simultaneously pivot about their support axis 44 to lower the tools into engagement with the rail joint and sever the end portions of both the joined rails at a location substantially defined by the ends of the joint bar 12.

After the cropping operation is completed, the truck 28 is positioned so that a hydraulically operated digger blade 46, powered by ram 47 mounted on the truck, removes the ballast directly under the cropped joint and simultaneously pushes the severed, bolted rail section from the track.

The machine 26 proceeds up the track alternately cropping a joint from both sets of rails of the track 20. It is common practice to longitudinally stagger the joints of the rails constituting a bolted track, and the spikes will be pulled, the ties longitudinally translated from below the joint, the rail ends cropped and the ballast removed at each joint of the bolted rails. After passage and operation of the machine 26 over a track section, the track will appear as shown in FIG. 2 wherein cropped rail joint gaps are shown at 48, and displaced ties appear alternately on one side of the track and then the other. As mentioned above, either two or three ties will be removed from under the track, depending on the relationship of the bolted rail joint to the ties.

With reference to FIG. 1, after the machine 26 moves to the right to the next rail joint, the welding machine 50 mounted on eight-wheeled truck 52 is moved to the right in an up-track direction over the gap 48 produced at the severed rail joint. In that the length of the truck 52 is greater than that of the gap 48, and as the truck 52 is provided with four axles rigidly affixed to the truck frame, the truck may easily pass over the gap produced by severing the rail ends. The machine 50 is provided with an engine 54 which provides the motive force for the truck 52 and also drives a hydraulic pump 56. The machine 50 is located over the gap 48 whereby the welding head 58 of the rail welder is positioned adjacent the rightmost rail cropped end, as viewed in FIG. 1. Thereupon, the four vertically disposed hydraulic jacks 60 located at the corners of the truck 52 are lowered to cause the jack plungers 62 to move downwardly into engagement with the roadbed and lift the truck 52 from the rails. A rail gripper 64 then grips the rail to the left of gap 48, FIG. 1a, and the hydraulic piston 66 mounting the rail gripper 64 is moved to the right within the hydraulic cylinder 68 to longitudinally shift the gripped rail to the right, whereby the opposed facing ends of the cropped rails may be brought into abutting relationship within the welding head 58. It will be appreciated that before the gripped rail may be translated to the right, the bolted rail connection 69 at the other end of the gripped rail must be disassembled to permit the rail to be longitudinally translated in the up-track direction.

The welding head 58 communicates with welding gas storage cylinders 70, and the welding operation now takes place. As will be noted from FIG. 1, the welding head 58 extends below the rails into the clearance 72 provided by the removal of the ballast and a strong butt weld may be produced. As the welding takes place, the ends of the weld may be maintained in tight interconnection by the hydraulic cylinder 68, and so maintained until the welded joint adequately cools. After the welding operation has been completed, the gripper 64 is released from the rail, the welding head 58 is elevated to clear the ties, the jacks 60 are retracted to lower the truck 52 upon the rails, and the machine 50 is moved to the right in the up-track direction to clear the machine from the joint. At this time the cutting torch 73, which also communicates with the welding gas cylinders 70, may be employed to remove the flash around the welded joint which usually occurs during a welding operation.

The machine 50 then moves to the right in the up-track direction to the next severed joint which will occur on the other rail constituting the track.

After the cropped rail ends have been welded, rail-finishing machine 74 mounted on truck 76 is positioned over the welded joint. The truck 76 also includes eight wheels mounted on axles which are rigid with the truck frame. An engine 78 provides the self-propelled motive power. The machine 74 includes four grinding wheels 80, two of which are adapted to associate with a common rail, which are drivingly interconnected to an engine 82 through a power transmission means which includes a belt 84 and a gear box 86. The wheels 80 are mounted on structure permitting them to be elevated, lowered, and separated. The configuration of the grinding wheels 80 will be appreciated from FIG. 9, wherein the grinding wheels are shown in an elevated position. The wheels 80 are of sufficient diameter so as to grind the sides of the ball 88 of the rail and grind the bottom surface and sides of the rail flange 90 and the rail web. In this manner, the welded joint is machined to produce a cross section substantially identical to that of the remainder of the track. Thus, weld flashing is removed and no flash or irregularities due to the weld will be present to interfere with subsequent longitudinal rail movement during movement of the rail by cylinder 68.

The previously described operation of the machines 26, 50, and 74 continues in sequence in an up-track direction to the right, as viewed in FIG. 1. The grinding operation performed machine 74 will take place after each weld and before the rail is translated during the next welding operation.

It will be appreciated that due to the sequential, longitudinal movement of the welded rail in the up-track direction during the welding procedure, the gap at the joint 92, where the first welded rail section was unbolted at the unsevered end, will increase each time the welded rail is longitudinally translated. Upon the gap between the rail end 94 and rail end 96 substantially equaling the length of a conventional rail, a conventional rail 98, FIG. 1, will be inserted into the gap. To permit the insertion of the rail 98 into the gap, it will be necessary to remove the spikes from the tie plates on the outside of the gap. This removal of the outside spikes is usually accomplished by the spike puller 34 of machine 26 and may take place before the first cropping operation. Thus, upon the gap equaling that of the length of the rail 98, the rail 98 may be placed upon the ties and positioned. The right end of the rail 98 may be bolted to the end 96 of the welded rail, or it is possible to reverse the movement of machines 26, 50, and 74, to position the welding head 58 over the rail end 96 and the right end of the rail 98 and perform a rail weld at this joint. If the rail 98 is welded to the welded rail length, it would preferable that cropping take place and, when using the welding procedure, the rail 98 may be first cropped at its right end.

After the rail 98 has been inserted into the gap produced by the welding of a plurality of rails 10, the machine 100 may be moved along the welded rails by the engine 102 mounted thereon, which also actuates a hydraulic pump 104. The machine 100 is provided with a hydraulically operated tie repositioner 106 which repositions the displaced ties back to their original locations under both rails of the track. A ballast repositioner and regulator 107 replaces the ballast under the replaced ties, and four hydraulically actuated spike drivers 108 are also mounted on the machine 100, whereby spikes may be inserted into the ties to affix the repositioned ties to the welded track.

After the apparatus of machine 100 repositions the ties below the welded joint and spikes the rail to the ties, final finishing machine 110 is positioned over the rail joint. The machine 110 includes a self-propelling engine 112 and a belt-type grinder 114 adapted to associate with each of the rails constituting the track. The grinding belt is lowered into engagement with the appropriate rail and is drivingly connected to the engine 112 by belting 116. The grinding belt finish grinds the ball of the track to insure a flush connection between the upper surfaces of the balls of the welded track sections.

After the desired rail length is welded the machine 118 will follow the machine 110, and is provided with rail anchor hoppers 120 which contain rail anchors which are affixed to the welded rail at the ties to prevent longitudinal rail movement relative to the ties. The machine 118 includes the rail anchor installing device 124 whereby rail anchors are received from hopper 120 and installed upon the rail.

It will be appreciated that as the operations previously described are alternately performed on one rail and then the other, the movement of the machines 26, 70, and 74 in the up-track direction will result in a track having two continuously welded rails. As approximately 18 inches are removed from each rail end during the cropping operation, a new rail 98 will have to be inserted into the resultant gap at the rail joint 92 after approximately twelve welds in each of the track rails has taken place. Thus, in the practice of the invention, the resultant continuous rail lengths will usually consist of twelve welded rail sections. However, if desired, welded rail lengths of any length may be produced by welding both ends of the rail 98 to the adjacent rail sections, rather than bolting the left end of rail 98 to rail end 94, as previously described. Such welding of rail 98 at both ends would be performed by the described machines. If it is desired to return the track to a serviceable condition at the end of the working day, it is only necessary to insure that the rail 98 is inserted within the resultant gap and affixed to the ties therebelow to restore the track to a usable condition, assuming that no rail ends have been cropped which have not been welded. Thus, the block system of the track will not be disrupted and the track may be placed in serviceable condition on relatively short notice.

As the machines 26, 50, and 74 are moving along the track in the up-track direction, and as the track is longitudinally translated in the similar up-track direction by the cylinder 68 during the welding operation, the welding will always occurs at the location of a previously bolted rail joint. Thus, the machine 26 may proceed along the track well ahead of the welding machine 50.

The terms "in-track" and "up-track" as used in the specification and claims are used in the conventional sense as understood in the railroad art, i.e., "in-track" means rails that are mounted in situ on the road bed on ties, and "up-track" designates the forward direction of movement of equipment mounted upon a rail track.

It will be appreciated that although the machine 50 is illustrated as employing gas rail welding apparatus that the rail ends may be welded by any conventional rail welding method, such as electric resistance welding, induction welding, thermal welding, or explosive-type welding, and it is not intended that the method of the invention be confined to the use of the disclosed apparatus. In this regard, the function of the machines 26, 50, 74, 100, 110, and 118 can be accomplished by individual machines. For instance, the spike puller, tie remover, ballast remover, and rail cropper may each constitute a separate machine mounted on a separate truck. The particular features of the illustrated apparatus have not been shown in detail as the structural details are known in the art. Spike pullers, tie removers and repositioners, ballast removers and repositioners, jacks, welding heads and track grinders are known in the art, and the components of the described machines may be constructed in accord with the known manner to perform the described function. It is intended that the practice of the invention be limited only by the scope of the following claims.

We claim:
1. The method of fabricating welded rail continuous lengths from shorter in-track joined rail lengths affixed to railroad ties by spikes comprising the steps of:
   (a) removing the spikes from the ties disposed adjacent the in-track rail joints,
   (b) removing the ties from which the spikes have been removed from below the in-track rail joints,
   (c) severing the in-track joined rails adjacent the joints to define opposed rail ends,
   (d) longitudinally translating at least one of the severed rails along the roadbed to dispose the opposed severed rail ends in adjacent relation, and
   (e) welding the adjacent opposed severed rail ends together upon being adjacently disposed.

2. The method of fabricating welded rail continuous lengths from shorter in-track joined rail lengths affixed to railroad ties by spikes comprising the steps of:
   (a) removing the spikes from the ties disposed adjacent the in-track rail joints,
   (b) removing the ties from which the spikes have been removed from below the in-track rail joints,
   (c) severing the in-track joined rails adjacent the joints to define opposed rail ends,
   (d) longitudinally translating at least one of the severed rails along the roadbed to dispose the opposed severed rail ends in adjacent relation,
   (e) welding the adjacent opposed severed rail ends together upon being adjacently disposed, and
   (f) machining the welded rail portion to remove flash and irregularities produced during welding.

3. The method of fabricating welded rail continuous lengths from shorter in-track joined rail lengths comprising the steps of:
   (a) disconnecting an in-track rail at a joint,
   (b) severing the in-track joined rails adjacent the joint in the up-track direction from said disconnected rail joint,
   (c) longitudinally translating the disconnected rail in the up-track direction along the roadbed to dispose the severed end thereof adjacent the opposed rail severed end,
   (d) welding the opposed severed rail ends together upon being adjacently disposed, and
   (e) sequentially longitudinally translating and welding severed opposed rail ends in the up-track direction.

4. The method of fabricating welded rail continuous lengths from shorter in-track joined rail lengths comprising the steps of:
   (a) disconnecting an in-track rail at a joint,
   (b) severing the in-track joined rails adjacent the joint in the up-track direction from said disconnected rail joint, (c) longitudinally translating the disconnected rail in the up-track direction along the roadbed to dispose the severed end thereof adjacent the opposed rail severed end, (d) welding the opposed severed rail ends together upon being adjacently disposed, (e) sequentially, longitudinally translating and welding severed opposed rail ends in the up-track direction, and (f) inserting a rail of predetermined length in the gap produced at said disconnected rail joint upon the gap substantially equaling the length of said rail of predetermined length.

5. The method of fabricating welded rail continuous lengths from shorter in-track joined rail lengths comprising the steps of:

(a) severing the in-track joined rails adjacent the joints to define opposed rail ends, (b) sequentially longitudinally translating said severed rails in the up-track direction to dispose the opposed severed rail ends in adjacent relation, and (c) welding the adjacent opposed severed rail ends together upon being adjacently disposed.

6. The method of fabricating welded rail continuous lengths from shorter in-track joined rail lengths affixed to railroad ties by spikes comprising the steps of:

(a) removing the spikes from the ties disposed adjacent the in-track rail joints, (b) removing the ties from which the spikes have been removed from below the in-track rail joints, (c) severing the in-track joined rails adjacent the joints to define opposed rail ends, (d) longitudinally translating at least one of the severed rails along the roadbed to dispose the opposed severed rail ends in adjacent relation, (e) welding the adjacent opposed severed rail ends together upon being adjacently disposed, (f) machining the welded rail portion to remove flash and irregularities produced during welding, (g) replacing the displaced ties, and (h) inserting spikes into the replaced ties and affixing the welded rail thereto.

7. The method of fabricating welded rail continuous lengths from shorter in-track joined rail lengths comprising the steps of:

(a) removing the roadbed components adjacent the in-track rail joints providing clearance thereunder, (b) disconnecting an in-track rail at a joint, (c) severing the in-track joined rails adjacent the joint in the up-track direction from said disconnected rail joint, (d) longitudinally translating the disconnected rail in the up-track direction along the roadbed to dispose the severed end thereof adjacent the opposed rail severed end, (e) welding the opposed severed rail ends together upon being adjacently disposed, and (f) sequentially, longitudinally translating and welding severed opposed rail ends in the up-track position.

8. The method of fabricating welded rail continuous lengths from shorter in-track joined rail lengths comprising the steps of:

(a) removing the roadbed components adjacent the in-track rail joints providing clearance thereunder, (b) disconnecting an in-track rail at a joint, (c) severing the in-track joined rails adjacent the joint in the up-track direction from said disconnected rail joint, (d) longitudinally translating the disconnected rail in the up-track direction along the roadbed to dispose the severed end thereof adjacent the opposed rail severed end, (e) welding the opposed severed rail ends together upon being adjacently disposed, (f) sequentially, longitudinally translating and welding severed opposed rail ends in the up-track position, and (g) replacing the roadbed components previously removed.

9. The method of fabricating welded rail continuous lengths from shorter in-track joined rail lengths comprising the steps of:

(a) removing the roadbed components adjacent the in-track rail joints providing clearance thereunder, (b) disconnecting an in-track rail at a joint, (c) severing the in-track joined rails adjacent the joint in the up-track direction from said disconnected rail joint, (d) longitudinally translating the disconnected rail in the up-track direction along the roadbed to dispose the severed end thereof adjacent the opposed rail severed end, (e) welding the opposed severed rail ends together upon being adjacently disposed, (f) inserting a rail of predetermined length in the gap produced at said disconnected rail joint upon the gap substantially equaling the length of said rail of predetermined length, (g) affixing said rail of predetermined length at each of its ends to the adjacent rail end, and (h) sequentially, longitudinally translating and welding severed opposed rail ends in the up-track position.

10. The method of fabricating welded rail continuous lengths from shorter in-track joined rail lengths comprising the steps of:

(a) removing the roadbed components adjacent the in-track rail joints providing clearance thereunder, (b) disconnecting an in-track rail at a joint, (c) severing the in-track joined rails adjacent the joint in the up-track direction from said disconnected rail joint, (d) longitudinally translating the disconnected rail in the up-track direction along the roadbed to dispose the severed end thereof adjacent the opposed rail severed end, (e) welding the opposed severed rail ends together upon being adjacently disposed, (f) inserting a rail of predetermined length in the gap produced at said disconnected rail joint upon the gap substantially equaling the length of said rail of predetermined length, (g) affixing said rail of predetermined length at each of its ends to the adjacent rail end, (h) sequentially, longitudinally translating and welding severed opposed rail ends in the up-track position, and (i) replacing the roadbed components previously removed.

References Cited

UNITED STATES PATENTS

| | | | |
|---|---|---|---|
| 602,284 | 4/1898 | Eyre | 104—15 |
| 700,994 | 5/1902 | Torre et al. | 104—15 |
| 2,250,869 | 7/1941 | Jones et al. | 104—15 |
| 3,019,536 | 2/1962 | Keshaw | 37—104 |
| 3,105,674 | 10/1963 | Stewart | 104—9 |

ARTHUR L. LA POINT, *Primary Examiner.*

R. A. BERTSCH, *Examiner.*